United States Patent [19]
Waters et al.

[11] Patent Number: 5,907,607
[45] Date of Patent: May 25, 1999

[54] SERVICE CREATION APPARATUS FOR A COMMUNICATIONS NETWORK

[75] Inventors: Donald G. P. Waters, Woodbridge; Jeremy Pavier, Ipswich; Graham D. Turner, Woodbridge, all of United Kingdom; Richard D. Cox, Garland, Tex.; Andrew T. Hunter, Dallas, Tex.; Jeffrey K. Rand, Coppeol, Tex.

[73] Assignee: British Telecommunications public limited company, London, United Kingdom

[21] Appl. No.: 08/727,518

[22] PCT Filed: Apr. 21, 1995

[86] PCT No.: PCT/GB95/00913

§ 371 Date: Jan. 15, 1997

§ 102(e) Date: Jan. 15, 1997

[87] PCT Pub. No.: WO95/29564

PCT Pub. Date: Nov. 2, 1995

[30] Foreign Application Priority Data

Apr. 21, 1994 [GB] United Kingdom ................. 94302848

[51] Int. Cl.⁶ .......................... H04M 3/42; H04M 7/00
[52] U.S. Cl. ................. 379/207; 379/230; 395/200.58; 395/200.8
[58] Field of Search ................... 379/111, 127, 379/201, 207, 230, 269; 395/200.58, 200.8

[56] References Cited

U.S. PATENT DOCUMENTS

| | | | |
|---|---|---|---|
| 5,241,588 | 8/1993 | Babson, III et al. | 379/201 |
| 5,323,452 | 6/1994 | Dickman et al. | 379/269 X |
| 5,481,601 | 1/1996 | Nazif et al. | 379/230 X |

OTHER PUBLICATIONS

Omiya et al, "Service Creation and Execution Domain Concept for the Intelligent Network", International Conference on Communications, ICC '91, vol. 3, Jun. 23; Denver US, pp. 1288–1292, XP 000277540.

Morgan et al, "Service Creation Technologies for the Intelligent Network", AT&T Technical Journal, vol. 70, No. ¾, 1991, New York US, pp. 58–71, XP00021088.

Bell Communications Research Special Report SR–NPL–001623, Jun. 1990, New Jersey, US, pp. 2–41–2–44 "Advance Intelligent Network Release 1 Network and Operations Plan".

Niitsu et al, "Compouter–aided Stepwise Service Creation Environment for Intelligent Network", Supercomm/International Conference on Communications '92, vol. 1, Jun. 14; 1992, Chicago, US, pp. 454–458.

Fujioka et al, "Universal Service Creation and Provision Environment for Intelligent Network" International Switching Symposium 1990, vol. 3, May 28; 1990, Stockholm, SE, pp. 149–156, XP000130889.

Waksberg, "L'AXE 10 et le reseau Intelligent", COMMUTATION ET TRANSMISSION, vol. 15, No. 4, 1993, Paris, France, pages 67–76, XP000414675.

Slides by Inventor Waters at a presentation in the UK in MAR. OF 1993.

*Primary Examiner*—Harry S. Hong
*Attorney, Agent, or Firm*—Nixon & Vanderhye P.C.

[57] ABSTRACT

A service creation system for a communications network of the intelligent network type has three different levels at which service creation activities can be carried out, these being SCE1, SCE2 and SCE3. The use of separate levels allows access to the service creation system to be kept functionally separate for users having different interests in the network. Hence, features which have to be installed at the network element level for a selected service to be available can be created in SCE1. Marketable service features, which give a view of features in that they encapsulate call handling logic thereof together with support and management descriptions of the feature, can be created in SCE2. Service packages, which permit collection of marketable service features to meet requirements of a service together with service-specific support and management information, can be created in either of Sce2 or SCE3. Profiles, which list the features relevant to a service for a user and provide data slots for the data necessary to each feature, can be provisioned and modified in SCE3.

12 Claims, 13 Drawing Sheets

SERVICE CREATION APPARATUS FOR A COMMUNICATIONS NETWORK

FIELD OF THE INVENTION

The present invention relates to service creation apparatus for a communications network, and finds particular application in intelligent networks.

Related Art

As communications networks have developed, there has been a major increase in the number and variety of services which a network operator can deploy. It is a key commercial issue for network operators to be able to create and deploy new services quickly and efficiently. The intelligent network form of architecture, wherein intelligence is provided at a variety of points in or associated with a communications network rather than primarily at a switch or exchange as has been the case in the past, has been developed at least partly to give the network operator the facility to provide new services with speed and flexibility.

A key principle in intelligent networks (IN) is the separation of software which controls basic switch functionality, such as setting up switch paths, from the software that controls call progression. Referring to FIG. 23, this has been achieved in known INs by enabling network exchanges 230 to recognise calls which require modified call progression and to suspend ordinary call processing. The decision to suspend call processing is based on the meeting of pre-specified trigger criteria, for example dialling digits, line condition or time of day, at certain points during the call. This can be described as "service switching point (SSP)" functionality being provided at the network exchange 230.

On recognising a call needing an IN-based service, the SSP functionality refers to a service control point (SCP) 231 and call progression is thereafter controlled by intelligence outside the basic network exchange 230 to provide whatever service the call required.

An aspect of an intelligent network architecture which is particularly relevant to the provision and modification of services is the service creation and deployment system. Attributes that are particularly attractive in an IN to accelerate the creation of new services are:

i Functional separation—this is the separation of basic core functions of real time call switching from the customer and service specific aspects, so that the latter can be changed more easily, which is mentioned above.

ii Portable software environment—enabling services to be developed once and then run on SCPs 231 provided by different suppliers.

iii Generic building blocks—building services from common modules allows considerable reuse and hence speed of development.

iv Service logic programs (SLPs)—a simple language for specifying the linkages between building blocks. SLPs are usually produced by service creation tools.

v Graphical service creation tools—these tools enable services to be rapidly created, by 'on screen' manipulation of icons which represent the generic building blocks.

vi Service and network simulators—when a service has been created, it can be simulated to check its functionality, performance, cost, etc.

vii On-line deployment—when a service is ready for deployment it can be electronically sent to the network and the appropriate management systems, from the service creation tool.

Services are created, in a known type of service creation environment 232, from the generic building blocks by specifying the sequences of these blocks and any conditonal linkages between the blocks. This specification is frequently known as a script or service logic program (SLP) and is usually generated by a service creation tool. When this SLP is deployed into the network it needs to be 'executed'. This is done in a Service Logic Execution Environment (SLEE) which often sits in the SCP 231. The module for doing this execution itself is often called a Service Logic Interpreter (SLI) because many IN implementations use an interpreted language for their SLPs. It can alternatively be called for instance a Service Engine, which more clearly can provide flexibility to support interpreted, compiled, and possibly other forms of SLP.

Together with the Service Creation tools themselves, the use of re-usable generic building blocks is very important in service creation. In the general world of computing much work has been done on trying to achieve significant software reuse because the benefits are enormous. For example, reusing a program three times effectively triples productivity and furthermore on the second and subsequent time it is used, the lead time can be virtually zero.

Despite these benefits, general software reuse is still rare because it is difficult to realise. However, within the fairly closed domain of the SCP, where the discrete operations of the underlying network are well understood, it is possible to build generic pieces of software to drive these underlying operations. These are the building blocks which can be called in many different sequences to provide the diverse range of IN services.

A typical building block might be "time of day routing". This building block would check the data in a user's profile which may state that after 6:00 pm calls to a particular number are diverted to a night-watchman. The "time of day routing" building block would then check the current time and route the call appropriately.

SLPs can be delivered to the SLEE via a Service Management System (SMS) 233. This is generally responsible for service management, deployment, and provisioning of customers and updating customer specific data held on the SCP 231 and the Service Data Point (SDP) 234.

It is advantageous that service creation can be carried out not only by a network service provider but also by subscribers or users themselves. Service Creation technology enabling different entities to develop or modify services is described in the publication "Service Creation Technologies for the Intelligent Network" by M J Morgan et al, published in the AT&T Technical Journal Volume 70, Summer 1991, No. 3/4, New York U.S.

SUMMARY OF THE INVENTION

In embodiments of the present invention, there is provided a service creation system for a communications network of the intelligent network type, which has three different levels at which service creation activities can be carried out.

These levels may be designated for instance SCE1, SCE2 and SCE3. The use of separate levels allows access to the service creation system to be kept functionally separate for users having different interests in the network. Hence, features which have to be installed at the network element level for a selected service to be available can be created in SCE1. Marketable service features, which give a view of features in that they encapsulate call handling logic thereof together with support and management descriptions of the feature, can be created in SCE2. Service packages, which permit collection of marketable service features to meet requirements of a service together with service-specific support and management information, can be created in either of SCE2 or SCE3. Profiles, which list the features relevant to a service for a user and provide data slots for the data necessary to each feature, can be provisioned and modified in SCE3.

In preferred embodiments of the present invention, therefore, each of the levels is provided with means to generate different respective types of software entities, a first of said levels having means to generate service application features which comprise code objects which can be deployed in elements of the network by means of a service distribution system, and a second of said levels having means to generate marketable service features, these comprising call-handling logic of a service application feature encapsulated with support and management descriptions for that feature.

The second of the levels may advantageously have means to store and output service packages, these being software entities having an association function for identifying and associating marketable service features with specific services available by means of the communications network.

A third of the levels may also have means to generate service packages, and means to generate or modify profiles, a profile comprising a list of one or more features that a user needs in selecting a service of said network, and means to store data relevant to each feature such that the feature can operate successfully in the context of the selected service.

A further advantage of a multi-level system of this type is the variation in control mechanisms which an be provided. For instance, control can be exercised at SCE2 of facilities, mechanisms or the like available to users operating at SCE3.

DETAILED DESCRIPTION OF THE DRAWINGS

A service creation architecture according to an embodiment of the present invention is described below, by way of example only, with reference to the accompanying. Figures in which.

DETAILED DESCRIPTION OF EXEMPLARY EMBODIMENTS

Figure 1:
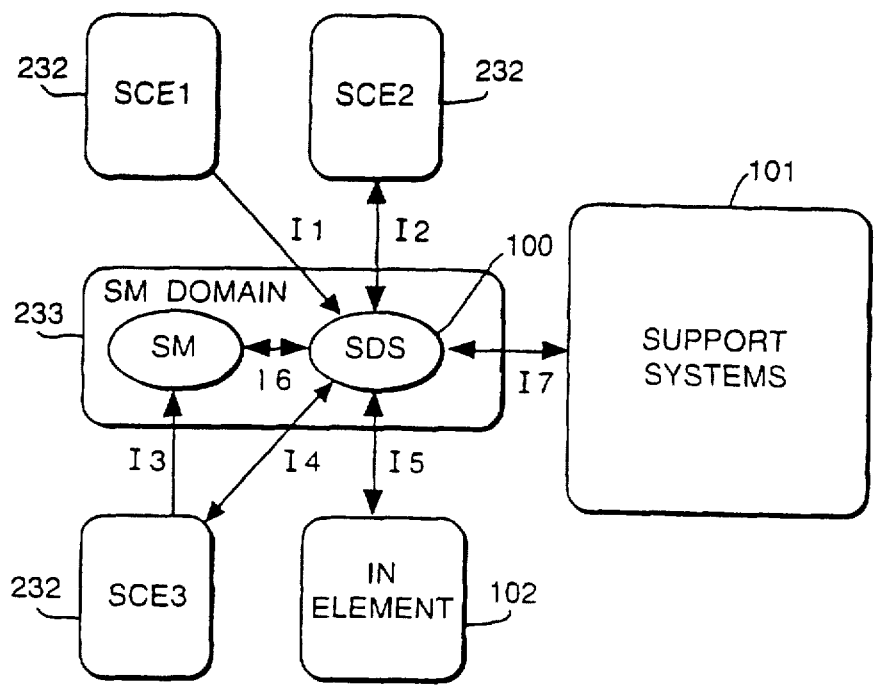
FIG. 1 shows a schematic overview of the service creation architecture.

In the following description, a number of acronyms are used in place of the relevant full titles of elements, processes and the like. These can be interpreted from the following glossary:

| Glossary | |
|---|---|
| API | Application Programming Interface |
| CM | Configuration Management |
| CPE | Customer Premises Equipment |
| GSC | Generic Service Component |
| IN | Intelligent Network |
| IVRU | Interactive Voice Response Unit |
| KTN | Key to the Network |
| MSF | Marketable Service Feature |
| SAF | Service Application Feature |
| SAP | Speech Applications Platform |
| SCE | Service Creation Environment |
| SCP | Service Control Point |
| SDS | Service Distribution System |
| SLA | Service Level Agreement |
| SLEE | Service Logic Execution Environment |
| SM | Service Management |
| SN | Service Node |
| SP | Service Package |

1. Introduction 1.1 Scope

The scope of the following description addresses the area of Service Creation in that it defines a logical architecture whereby Service Creation requirements can be delivered on Intelligent Networks.

It should be noted that any Service Management system configured for actual use is likely to have much greater scope and responsibilities than those described here. However, service management systems are known and, for the purpose of the present invention, need only be compatible with the service creation architecture described. It is not therefore the purpose here to describe completely and accurately a full Service Management system.

The data architecture that underpins this Service Creation Architecture is described in Section 5. However, the development of this data architecture and the ideas behind the specific interfaces (3.1) raise issues concerning the implementation of data distribution. The discussion of the issues does not fit cleanly within the scope of the following description. Instead, it forms part thereof but is appended as "Appendix 1" in Section 7.

1.2 Terminology

For the purposes of this description the term customer will refer to a corporate purchaser of service capabilities. The term user will refer to an individual employee of a customer who has service capabilities provided by the customer. Hence a customer has users.

For the purposes of this description the terms SCE1, SCE2 and SCE3 will be used throughout. They are used to described integrated software toolsets that provide Service Creation capabilities at differing architectural levels.

The term IN Element is used as a logical grouping to refer to Intelligent Network computing platforms such as Service Control Points (SCPs), Service Nodes (SNs) and Intelligent Peripherals (IPs). It should be understood that computing platforms used in different types of IN architectures, for instance perhaps with intelligence less centralised than in an IN based on SCPs are also covered by the term "IN Element".

1.3 Objectives

The objectives of the description are to:

define the overall Service Creation Architecture, specify a high-level view of the logical systems design which will be subsequently provided by physical systems.

identify and explain Service Creation entities (e.g. Marketable Service Features, Generic Service Components, etc.), identify interfaces, identify work packages and application entities, define a baseline architecture for Service Creation for migration of Service Creation into large scale public networks.

2. Service Creation Architecture Overview
2.1 Overview Description

The overview of the Service Creation Architecture is defined by the relationships that are understood to exist between existing or proposed entities such that new services and features may be rapidly deployed and provisioned, using automated processes and interfaces. To explain the relationships it is necessary to describe a Service Creation process, with reference to FIG. 1.

Service Applications and reusable features are developed at SCE1 232 as tested code. This code is delivered (via interface I1) to a Service Distribution System (SDS) 100 as repository, which stores and deploys (via interface 15) the code onto targeted IN Elements (SCPs 231, SNs, IPs 235, etc.).

SCE2 232 uses the SDS repository (via interface 12) 100 to build Marketable Service Features (see §5.2) and Service Packages (see §5.3).

Service Packages are delivered to Service Management functionality (SM) from the SDS repository 100 (via interface I6) in the Service Management Domain 233 and to SCE3 (via interface I4) for provisioning.

Service Packages, or parts thereof, are delivered to Support Systems (via interface I7) 101 to configure them for a new service.

SCE3 232 is used to create Profiles (see §5.4) which are delivered to SM (via interface I3) for validation.

Validated Profiles are passed to the SDS (via interface I6) 100 and distributed to the relevant IN Elements (via interface I5).

Interface I4 is also required to support invalidated Profile updates. These are more commonly known as Network-side updates. However, under this architecture it should be emphasised that any form of Profile update emanates from SCE3. Thus any update capability that exists within a service, on an IN Element or within customer premises equipment (CPE) is recognised as being SCE3 capability (see "2.2 Constraints b)", below).

2.2 Constraints a) A network operator's Service Management system 233 will exist either as a distinct platform or distributed across a range of platforms.

b) SCE3 represents provisioning capabilities either as distinct physical systems interfaced directly to a Service Management system 233, collocated as part of a Service Management system 233 or capabilities within network elements to support network-side updates. Large networks will probably require SCE3 to be all of these. SCE3 users vill usually comprise a network operator's Support people, customers and users.

c) SDS (see §4.4.2) represents a repository and distribution system, possibly distributed, part of a Service Management system 233 or requiring a separate platform. This will depend on the size of the target network and the performance and cost requirements associated with that network implementation.

d) IN Elements will comprise network-based computing facilities such as Service Control Points (SCPs) 231, Service Nodes (SNs) (not shown) and Intelligent Peripherals (IPs) 235 capable of supporting service applications and related customer datastores.

e) Interfaces and management systems will provide totally automated service deployment and provisioning across generic systems. The Service Creation architecture designs and subsequent workstring analyses proceed on this basis.

3. Service Creation Architecture

Figure 2:
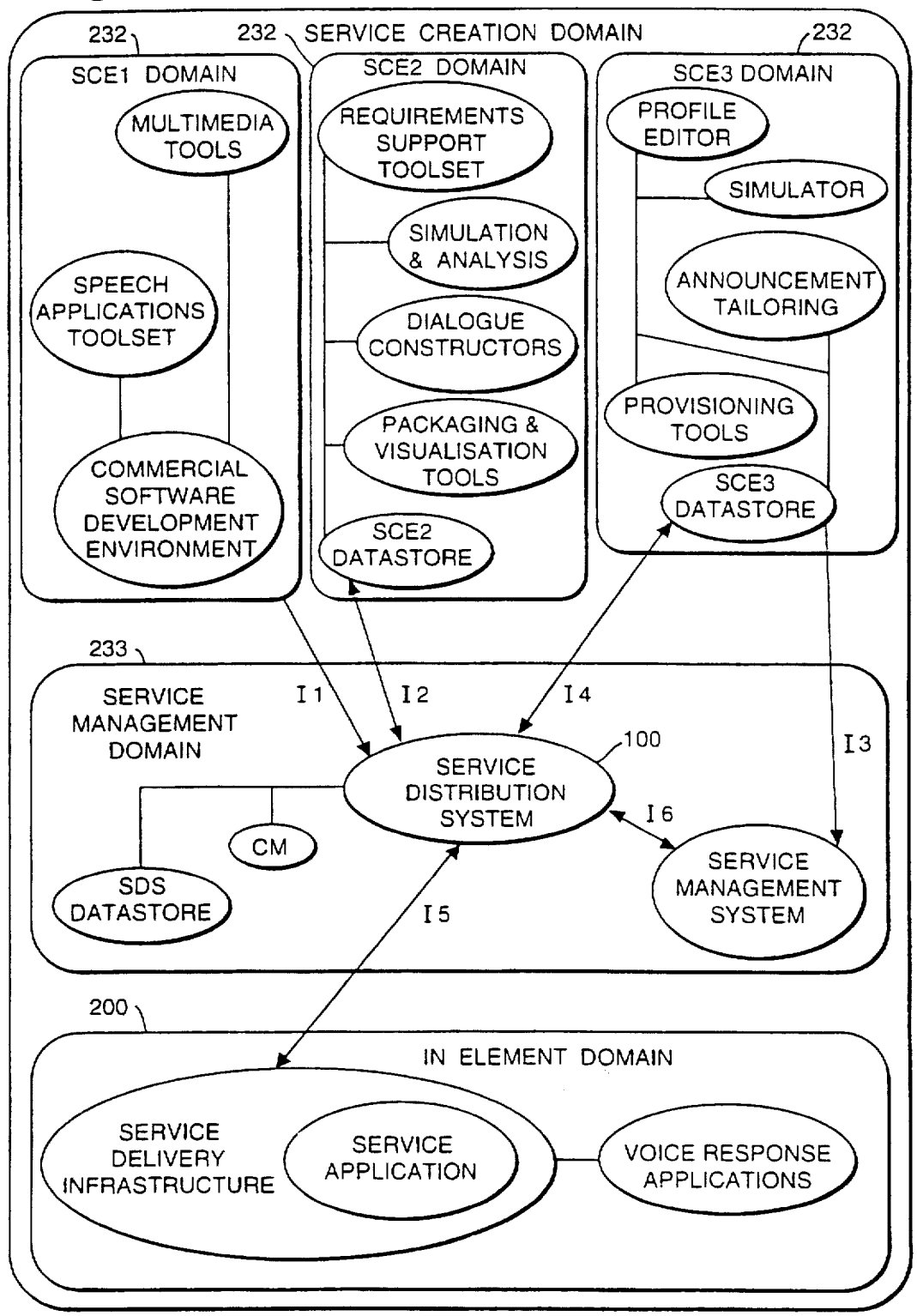
FIG. 2 shows a service creation domain and process relationships, relevant to the architecture of FIG. 1.

FIG. 2 shows a more detailed expression of the Service Creation Architecture. The diagram describes the relationship between major functional areas and the positioning of major subsystems concerned with the development of speech-based services. The interfaces with directional arrows correspond to the interfaces shown in FIG. 1 and listed in §3.1 (except Interface I7). Connecting lines between processes within domains represent some form of integration between software entities. This could be in the form of interfaces, file transfer, interprocess communications or application integration (internal data sharing).

The architecture is represented in terms of domains and processes rather than systems. Although the Service Creation Domain 232 is subdivided into five logical domains, the processes that reside within these domains will operate across a range of platforms and environments.

The three SCE Domains are logically separated to distinguish between the different requirements and types of usage and user that must be satisfied. These can be categorised:

| Domain | Users | Usage |
| --- | --- | --- |
| SCE1 | Service Provider Developers | Development of applications and features at code level for deployment in IN Elements. |
| SCE2 | Service Provider Developers Service Provider Marketing Service Provider Testers | Developers of Products and Services from reusable components to meet Marketing Requirements. Simulation and Analysis of prototype Services. Customer specific tailoring prior to service delivery. |
| SCE3 | Service Provider Developers Service Provider Support Operator Services Customers Users | Provisioning and Tailoring of Services and Service Instances during service operation. |

3.1: Interfaces

| Interface Number (Refer to FIGS. 1 & 2) | Interface Name | Interface Description |
| --- | --- | --- |
| I1 | SCE1-SDS I/F (Code) | Data interface between SDS and SCE1 to enable the deployment of applications, Service Application Features and Generic Service Components from SCE1 to SDS and onward to IN Elements. |
| I2 | SCE2-SDS I/F (Marketable Service Features/Service Packages) | Bi-directional data interface between SDS and SCE2. SCE2 picks up SAF/GSC capabilities from SDS repository and develops MSFs and SPs based on this information. MSFs are stored on SDS from SCE2. Service Packages are delivered to SDS from SCE2 where they are stored and deployed on appropriate IN Elements. |

| I3 | SCE3-SM I/F (Profiles) | Data interface between SCE3 and SM to enable the provisioning and tailoring of user/customer data necessary for the operation of network-based services. May also include graphics terminal emulation to allow customers to drive SM provisioning screens. Data is passed in the form of Profiles or Profile updates which must be validated by SM before distribution. |
|---|---|---|
| | SDS-SCE3 I/F (Service Package/Profiles) | Bi-directional data interface delivering Service Packages to SCE3 to describe new services and accepting, from SCE3, Profile updates (not requiring SM validation). In addition, new SAFs will be delivered to SCE3 across this interface to support provisioning validation and SCE3 simulation capabilities. |
| | SDS-IN Element I/F (Profiles/Code) | Bi-directional data interface between SDS and IN Element to enable the deployment and distribution of applications and features, and update provisioned data. Service data is passed in the form of Profiles and Profile updates. Deployment is achieved by the distribution of service Packages. |
| | SM-SDS I/F (Profiles/Service Packages) | Bi-directional data interface from SM to SDS to deliver provisioned and updated customer data for distribution to IN Elements. Data is passed in the form of Profiles and Profile updates. SM is also recipient of Service Packages when deployed from SDS. |
| | SDS-Support Systems | Logical grouping interface between the Service Distribution Systems and one or more Support Systems such as Billing, Fault Control, etc. This interface will be realised by a range of interfaces determined by specific designs. The data that is passed across these interfaces will be determined by the flexibility, configurability and "service creatibility" of these support systems. Control and specification of these interfaces does not lie within the Service Creation domain. |

4 Domain Description

4.1 SCE1 Domain

SCE1 represents the fundamental layer of service creation activity. SCE1 developers are responsible for developing Service Applications on IN Elements and the Service Delivery Infrastructure into which these applications will be deployed. Service Applications will be delivered in the form of reusable Service Application Features. These will comprise fully developed and tested code. SCE1 is the only place in the architecture that develops code into the network.

4.1.1 Commercial Software Development Enviroment

This system represents an integrated collection of software tools to support the development lifecycle. These tools will primarily be commercially available editors, compilers, configuration management systems, a nalysis, design, test and documentation tools. They are commonly based on conventional computer-aided software engineering (CASE) tools. Some of these development environments will be supplied by vendors to support development on specific IN Elements. At the very least SCE1 must provide an integration of deployment/testing tools to support dynamic deployment.

In addition to down-loading actual building blocks to the target systems, SCE 1 tools must also pass a representation of the building block to the SCE 2 tool. This representation covers:

A textual description of the block, for information purposes and as help text.

Its on screen presentation, i.e. the icon that schematically represents the function.

The rules governing interactions with other building blocks.

The data associated with the building blocks. These will eventually need to be provisioned for a particular customer.

4.1.2 Speech Applications Toolset

Software development tools that support the construction of speech-based dialogue features and services. These tools will generally be specific to the target platforms that are expected as IN Elements and may well be purchased with the platforms or developed internally to support particular platforms.

4.1.3 Multmedia Tools

Clearly, to support provision of multimedia services, services that support images, video and special fax capabilities will be required and consequently appropriate service creation tools and utilities will be required to support them.

4.2 SCE2 Domain

SCE2 can be defined as a Marketing, Testing and Packaging activity. The specific scope and range of activities taking place within SCE2 can be modified but they will clearly need to support the Service Creation process.

The tools at SCE2 will be used by product line developers, or their agents, and will need the following overall functionality:

Assemble a basic service, by dragging and dropping icons on a screen and linking them.

Define how much of the service flow can be altered at SCE level 3, i.e. by a customer. The rest of the service is then effectively fixed for all customers.

Pre-set some of the data associated with the service with default values and again define which of these a customer will be allowed to overwrite.

4.2.1 Requirerments Support Toolset

It is desirable to automate the capture of Marketing Requirements and to map them onto Service Definitions. This enables more efficient reuse across the entire development lifecycle. SCE2 will use automation tools to support its requirements capture activities.

4.2.2 Packaging and Visualisation Tools

It is at SCE2 that Service Application Features will be associated with Marketable Service Features (see §5.2) containing the Service Management, Network Management, SDS and Billing components necessary to support the provisioning and use of the feature in a live network. It is at SCE2 that MSFs are created. Marketable Service. Features will also be packaged into Service Packages. SCE2 must be able to create or define provisioning screens for SM and SCE3 use on the MSFs encapsulated within Service Packages, identify usage/charging characteristics specified by Service Level Agreements and provide feature editor rules for SCE3 that resolve feature interactions. In this respect it should be noted that the Service Packages constructed at SCE2 will control the configuration of SCE3 processes that use them.

4.2.3 Simulation and Analysis

Service Packages created at SCE2 must be capable of being simulated such that behavioural characteristics, traffic loading, performance and revenue forecasts can be made to determine customer acceptance, network impact and economic viability of services created at this level.

4.2.4 Dialogue Constructors

SCE2 users must be able to construct service or customer-specific dialogue and announcements for inclusion in Service Packages. These will be constructed by service-level provisioning of reusable announcement/dialogues within MSFs. These dialogues construction tools must be able to support a range of input mechanisms (analogue and digital) and a variety of storage formats (IN Element-specific). It may also be necessary for these tools to support sophisticated editing and signal processing functions for the construction of speech announcements from reusable fragments.

4.2.5 SCE2 Datastore

Local datastore for holding work in progress. All master data concerning SAFs, MSFs and Service Packages is held in the SDS Datastore (see below) and retrieved by SCE2 users.

4.3 SCE3 Domain

SCE3 activities are directly concerned with provisioning and tailoring. It is seen that there are two distinct types of provisioning at SCE3, behavioural and data provisioning. Behavioural provisioning is the manipulation of the service data in such a way as to effect a change in the logical operation of the service. Data provisioning is classically recognised type of provisioning, normally undertaken by Service Management Systems, whereby the data associated with a particular feature and/or user can be changed directly and the network updated appropriately.

The tools at SCE3 will therefore be used by customers directly, by network operators acting on behalf of specific customers or by marketing people acting on behalf of groups of customers. To support these various scenarios, the SCE3 functionality can be provided on a range of hardware, from personal computers (PCs) to sophisticated Unix workstations.

The general functions supported through an SCE3 are:

Tailor the service—within the constraints set at SCE2, the user may be allowed to change the flow or structure of their particular version of the service.

Provision some of the service data with customer specific values.

4.3.1 Profiling Editor

Customers are provided with a Service Package, containing a Service Template that represents a minimum profile that, when provided, will give a complete, fully featured service guaranteed to run. Customers can create a hierarchy of sub-templates from this master template according to the needs of their users. The tools provided allow customers to specify which user groups have access to which feature and how those features interact, within the constraints set by the feature editor rules specified at SCE2 (see above). The Profiling Editor allows the SCE3 user to view the logical ordering of their features within a Service and, under the aforementioned constraints, modify that sequence graphically. Customers will be able to create and assign particular Profiles, and hence feature sets, to individual users.

4.3.2 Simulator

Supporting the Profile Editor is a simulation toolset that allows customers to see the flow of their services and verify their behaviour. Customers will have the opportunity to simulate graphically a range of call scenarios that will allow them to assess whether their logically correct services behave as required.

4.3.3 Provisioning Tools

Customers can provision Profiles for each individual user, on the basis of the templates they have developed. At the user level, each user will have access to their own profile, either directly or via some form of remote support provided by the customer or the service provider. This will be a view onto their own collection of features that will present the appropriate provisioning screens allowing them to update their profiles, constrained only by access permissions and authorities specified either by the service provider (for network protection issues) or the customer (for whatever reasons they may choose).

4.3.4 Announcement Tailoring

Announcement tailoring tools, in co-operation with provisioning tools, may be used to offer some level of local personalisation of announcements in features or services that support this. Examples are the selection of corporate or departmental announcements for voice menu features or personalised messages for individual call completion services (Voice Mail, etc). These tools may operate as selection systems for sets of predefined messages or even allow local recording of speech for deployment in specialised network platforms such as interactive voice and speech application platforms.

4.3.5 SCE3 Datastore

Local persistent store. Will accept and configure SCE3 on receipt of Service Packages. Used for local store of template hierarchies and incomplete Profiles. May also be responsible for customer's local store of current Profiles (see Appendix 1 in Section 7).

4.4 Service Management Domain 4.4.1 Service Management System

In this architecture the Service Management System is required to manage and support customer services in areas other than the provisioning and tailoring of Profiles. The Service Management System will be responsible for Order Handling, Service Level Agreement enforcement and Service control (enabling, suspending and withdrawing Service). In addition, the logical interface to Support Systems (Interface I7) may well be handled through the Service Management System such that Fault Management, Charging, Pricing, Network Management, Element Management and Data Distribution, etc will be visible, configured and controlled through this system.

4.4.2 Service Distribution System

The Service Distribution System (SDS) 100 acts as the Service Creation repository. It stores and manages all code delivered by SCE1, distributing it to the appropriate IN Elements for installation and deployment. It makes network capability information (in the form of SAFs/GSCs) available to SCE2 so that Marketable Service Features (MSFs) can be developed from these and other building blocks. SDS also acts as the repository for these MSFs and the Service Packages that are constructed from them. This ensures that different instances of SCE2 will have maximum reuse ability regard to previously developed components and this shortened development times.

As a data distributor SDS delivers profiles to IN Elements according to network topology and customer distribution configurations dictated by operational systems such as Service or Network Management. The configuration data available to the SDS decouples the logical service networks from the physical network. In this way additional network switching or control capabilities can be introduced without requiring wholesale updates and reprovisioning on Service Management systems.

SDS performs a key role in servicing network-side updates, such that SCE3 systems can be registered as IN Elements for data distribution. Consequently network-side updates can apply at any IN Element and SDS will ensure that all dependent systems receive profile updates. This allows developers to present data to a common interface across the network. The consequences of this architectural decision are that SCE3 customers can update profiles or have their resident profile data updated from the network. This is interpreted as IN Elements having an SCE3 capability wherever service applications require a network-side update faculty from CPE (Customer Premises Equipment).

SDS will maintain a static master datastore for the IN Elements it supports. This datastore will contain sufficient data such that all Profiles are capable of being rebuilt and reprovisioned in the event of data corruption or loss within IN Elements.

4.4.3 SDS Datastore

The SDS Datastore is a persistent storage application containing the network master profile store. In addition, this store contains network configuration and data associated with IN Elements and customer distribution across those IN Elements. All profile data updates will be mastered here and SDS will distribute changes down to IN Elements and up to dependent SCE3 Datastores. As the Service Creation repository the SDS datastore will contain all code deployed by SCE1, all MSFs and SPs from SCE2, available for access, under configuration management control, from instances of SCE2 to provide rapid service Creation and component reuse capabilities. This arrangement has performance and dimensioning implications on both the datastore application and the platform on which SDS will reside.

4.4.4 Configuration Management

A configuration management system is necessary to administrate the repository functions of the SDS datastore. As the central repository for all network-deployed code, Marketable Service Features and Services Packages it is essential that Service Creators at SCEI and SCE2, as well as network operational people, have access to all versions of deployed Services and Features, if only for rollback security. This is especially important if services and features are to be deployed dynamically from several sources, and represents well-understood software development best-practice.

It is recognised that configuration management systems will probably also reside within the SCE domains (particularly SCE1 and SCE2), to maintain administrative control of local "work in progress", build and release management. However these systems will not be expected to carry the burden of maintaining network CM control. It is clear that once code, applications, Services and features are deployed into a live network, they move into an operational domain and must come under a logically separate system of control.

It is optional that it is the responsibility of the SDS Configuration Management system to maintain version management control of Profiles such that customer data can be rolled back from SCE3 and Service Management systems. An alternative is that a Service Management system provides this capability.

4.5 IN Element Domain
4.5.1 Service Delivery Infrastructure

The Service Creation architecture has been designed under the constraint that IN Elements have internal implementations that support rapid service creation and deployment activities, i.e. that something that offers the right capabilities for dynamic feature deployment, platform independence and the resolution of feature interactions exists on the IN Elements. The Service Delivery Infrastructure (SDI) is a design for an implementation that meets these and more detailed requirements for Rapid Service Creation. As such it is mentioned here for information, not as an architecturally dependent entity. Network entities such as particular Intelligent Peripherals may not host SDI, but still must support Service Creation activities within the context of this architecture.

An SDI has been designed to encapsulate and abstract the network and vendor-specific interactions of service applications. It provides an object-oriented framework into which service applications and features may be deployed.

Interfaces such as Service Management, Network Management, Billing, Fault Management and Call Models are encapsulated within objects, separating the applications from whatever transmission and management systems which may exist to support the service. The purpose of the SDI is to establish clearly the separation between

- the underlying physical network,
- discrete service networks,
- services available to be configured into particular service networks, and
- features and generic capabilities available to build a particular service.

The main purpose of separating services from infrastructure is to provide a dynamically extendible environment and allow feature-rich services to be introduced in very short time frames without impacting on other services or parts of the environment.

The SDI as described above is subject to co-pending International patent application numbers GB95/00420 and GB95/00421, also in the name of British Telecommunications plc, and the disclosure of those patent applications is incorporated herein by reference, as an example of a service delivery infrastructure which might be used.

Figure 3:
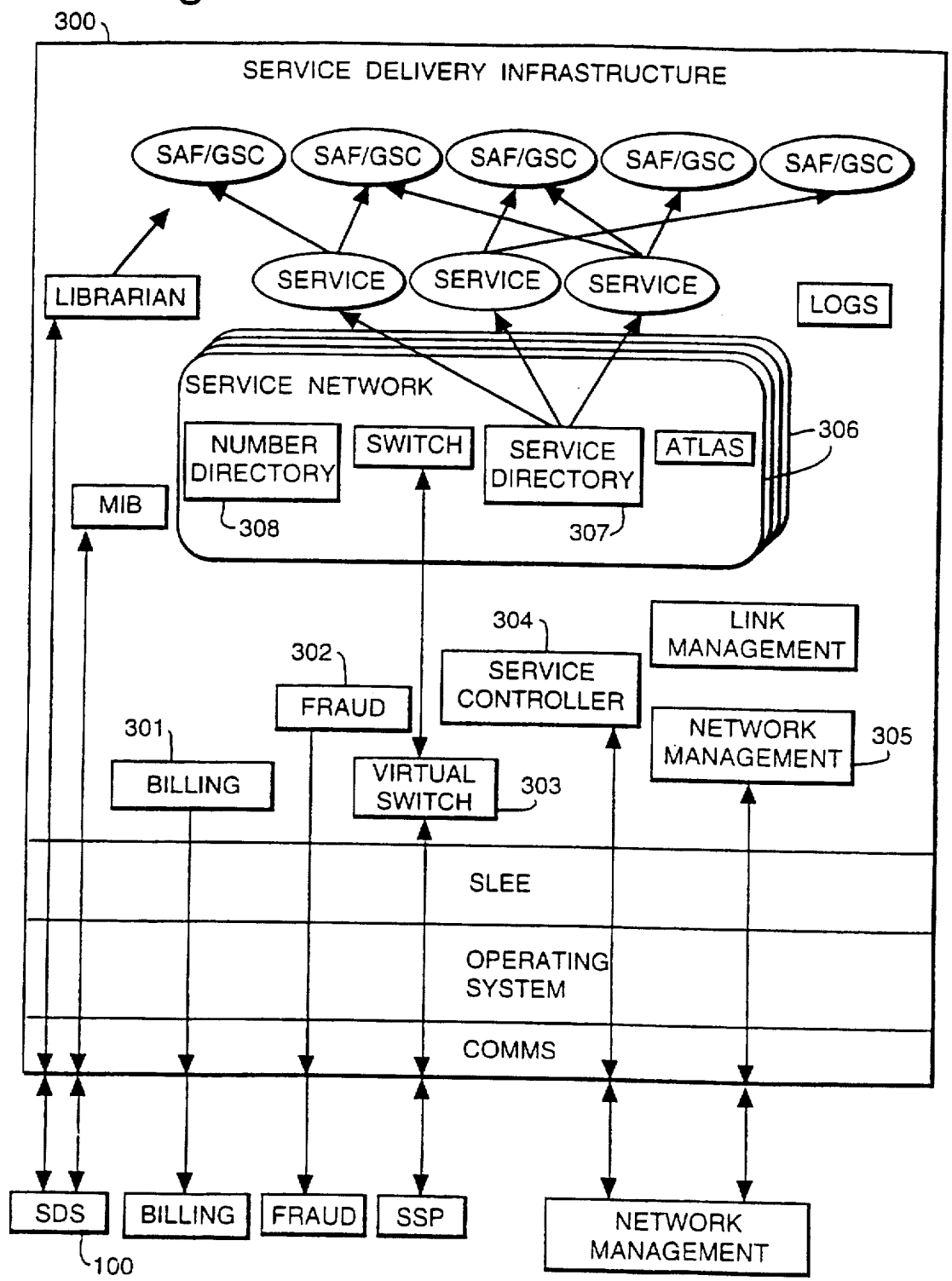
FIG. 3 shows a service delivery infrastructure and its relationship with other platform components on a typical intelligent network element.

FIG. 3 represents a relationship between a form of SDI 300 and other platform components on a typical IN Element. Interfaces to external systems, traditionally operated by function calls on the SLEE applications programming interface (API), are encapsulated in object representations 301–305 of those systems. The Virtual Switch 303 encapsulates the call models for one or more vendor's switches (SSPs) 230.

Services are delivered in the context of Service Networks 306 of which there will usually be one per customer. Each Service Network 306 has a Service Directory 307 for discriminating between services and a Number Directory 308 which represents the customer's dialling plan of virtual network numbers. Each Service Network 306 is capable of supporting a range of Services constructed from Service Application Features and Generic Service Components. New features and profiles are introduced dynamically from SDS 100.

4.5.2 Voice Response Applications

It is anticipated that many announcement, dialogue and messaging services will be provided by specialised platforms. These platforms will interact with main call control processors as intelligent peripherals. Applications within SDI will be able to use the facilities these iPs offer to provide complex speech-based services. The applications that provide these facilities will be developed to service the requests from SD. These applications will be designed to allow Service Creation and provisioning at all the previously described levels. It is not necessary that these Voice Response Applications will be responsible for any call control functions.

5. Service Creation Datat Architecture

Figure 4:
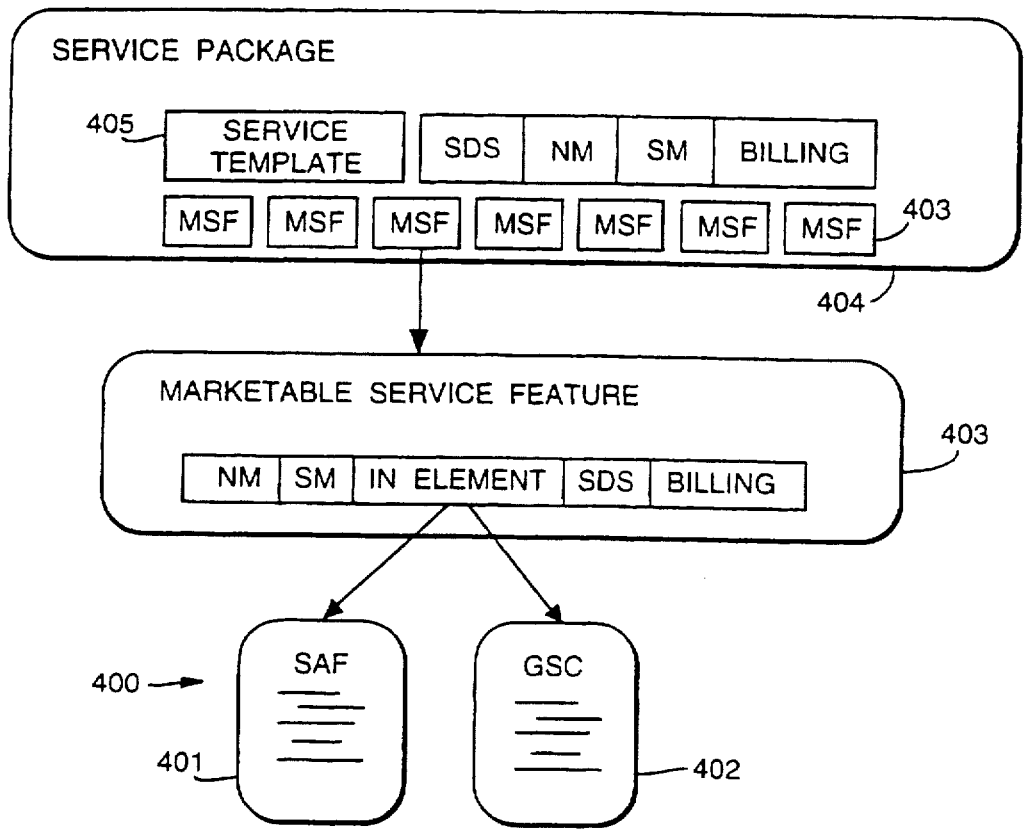
FIG. 4 shows a schematic service creation data architecture for use in the architecture of FIG. 1.

Referring to FIG. 4, the data architecture underlying the Service Creation Architecture reflects the three SCE domains. It provides a hierarchy of objects that are used to encapsulate increasingly complex information and logic as service development progresses towards deployment.

The lowest layer 400 is that of Service Application Features 401 and Generic Service Components 402. These are code objects that are developed to meet service requirements and use general service capabilities. These are developed at SCE1. Once deployed, these objects can be referred to by Marketable Service Features 403 created at SCE2. MSFs 403 encapsulate both the call-handling logic of a feature and the necessary support and management description of that feature, such that it can sold as part of a Service. A Service Package 404, again constructed at SCE2, permits the collection of a set of MSFs 403 that will meet the overall requirements of a particular Service. In addition a Service Package 404 will contain any Service-specific support and management information. Finally, a Service Package 404 will contain at least one Service Template 405, which describes the operation of the Service and defines the constraints under which modification of Service operation can take place. All these objects are described in more detail below.

5.1 Service Application Feature (SAF) 401

The relationship between Service Application Features (SAFs) 401 and Generic Service Components (GSCs) 402 can be described as follows. A GSC 402 represents a generic capability to support a range of services. A SAF 401 is the general name for any capability that is deployed in the network as a feature. This means that, usually, a SAF will either be a GSC or be composed of GSCs. However some Services may require specialised capabilities that cannot be termed generic. Both SAFs and GSCs will be reusable, but not all SAFs will be generic.

A Service Application Feature (SAF) 401 is a reusable code object, deployed on an IN Element. From the service creator's point of view it represents the lowest level of granularity discernible outside Service Creation Level 1 (SCE1). These objects are designed, developed and tested at SCE1. These objects represent the fundamental components of a Service and are designed to be reusable across different services. For example a number translation feature such as Call Diversion will be reusable across Voice and Data Services [hence it could be both GSC and SAF].

SAFs 401 are developed to be independent of specific Service Application implementations and have no intrinsic knowledge of any network architectures, specific platforms, Service Management, Network Management or Billing entities. As such a SAF represents a feature that can be deployed on an IN Element to provide call-handling capability, but has no value until instantiated with user state information associated with a particular Service, within the context of a Service Network.

5.2 Marketabe Service Feature (MSF)

Figure 5:
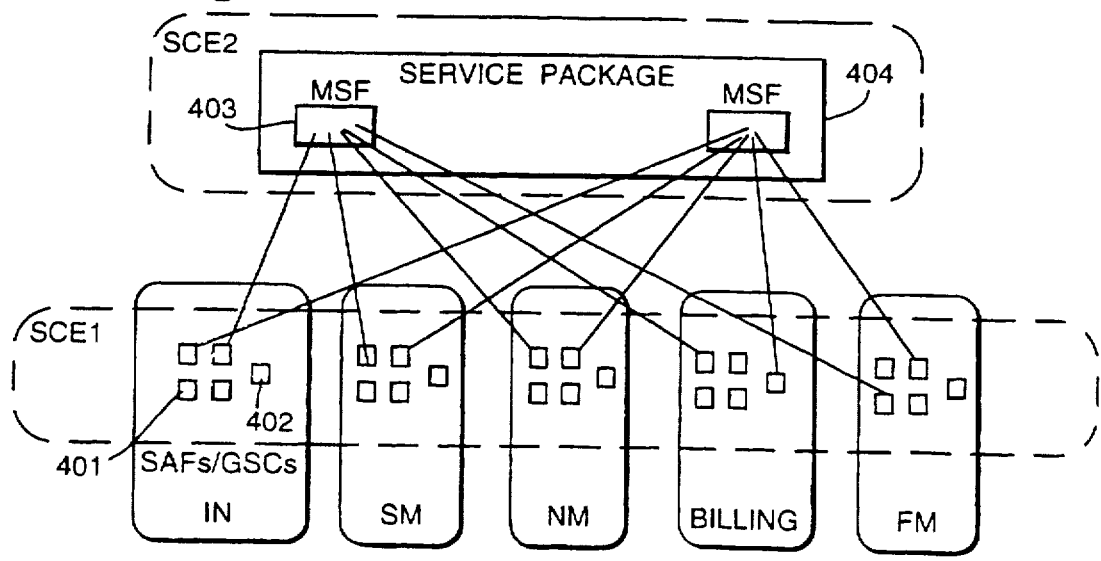
FIG. 5 shows schematically the construction of a type of object, a marketable service feature, from system-wide components.

Referring to FIGS. 4 and 5, a Marketable Service Feature (MSF) 403 represents a view down onto an underlying SAF 401. MSFs do not contain SAFs, but only refer to them. MSFs are created within SCE2 to add value to SAFs 401 such that they can be sold as part of a Service Package (see below). For a SAF to be marketable it must be associated with suitable Billing and Network Management references. Most importantly, the Service Management aspects of the feature must be addressed.

MSFs 403 contain the definitions of the screens necessary to input and update the provisionable aspects of the feature. These provisionable aspects will include the information necessary for the feature to run correctly. However, provisionable aspects of an MSF 403 may extend beyond those required by the underlying SAF 401 to which it refers. In particular there may be aspects of Network Management and Billing that are also provisionable for a particular feature.

Different MSFs may refer to the same underlying SAF. For example a straightforward scheduled number translation feature can be sold as Time of Day, Day of Week, Day of Year or Special Day Routing, Night Service or Open Hours depending on the marketing requirements of the Service or customer needs. They may even be resold under different guises within the same Service. All these MSFs have different provisioning and charging characteristics but the underlying network implementation will be common across them all.

The long-term aim of the MSF concept assumes that Billing, Service Management, Network Management, Fault Management, etc. components will be available as reusable building blocks (like SAFs/GSCs) on their target systems such that MSFs 403 and SPs 404 can be constructed from the SDS repository 100 for the majority of Services with the minimum of additional code developments. The construction of such building blocks implies that a certain amount of SCE1 activity takes place amongst the designers of such management systems to support SCE2. The consequence of this assumption is that service creators at SCE2 will have access to the complete capabilities of both the IN Elements and the supporting management systems to construct complete Services, for both large customers and individual users, for immediate deployment into generic Intelligent Networks.

5.3 Service Package (SP) 404

A Service Package (SP) 404 is the entity that is used, in SCE2, to associate MSFs 403 with a particular Service deemed marketable by the Service Provider. The SP 404 will contain MSFs as well as Service-specific information related to Service & Network Management and Billing.

5.3.1 Service Template

The Service Package 404 will contain one or more Service Templates, representing profile instances, upon which SCE3 customers can base their user profiles. The Service Template represents a tested expression of the service operation that the service provider guarantees to work when fully provisioned. The template encapsulates a set of rules, provided from SCE2, such that subsequent attempts to edit or modify the service operation and logic are constrained within operationally acceptable bounds. In this way the configuration of the SCE3 Profiling Tool is controlled by the Service Provider such that underlying feature interaction and dependency rules cannot be violated by customers when tailoring their profile for particular groups of users. The Service Template will also provide the mechanisms for partial provisioning at the Service or customer level, allowing specific tailoring to take place before delivery.

5.4 Profile 600

Figure 6:
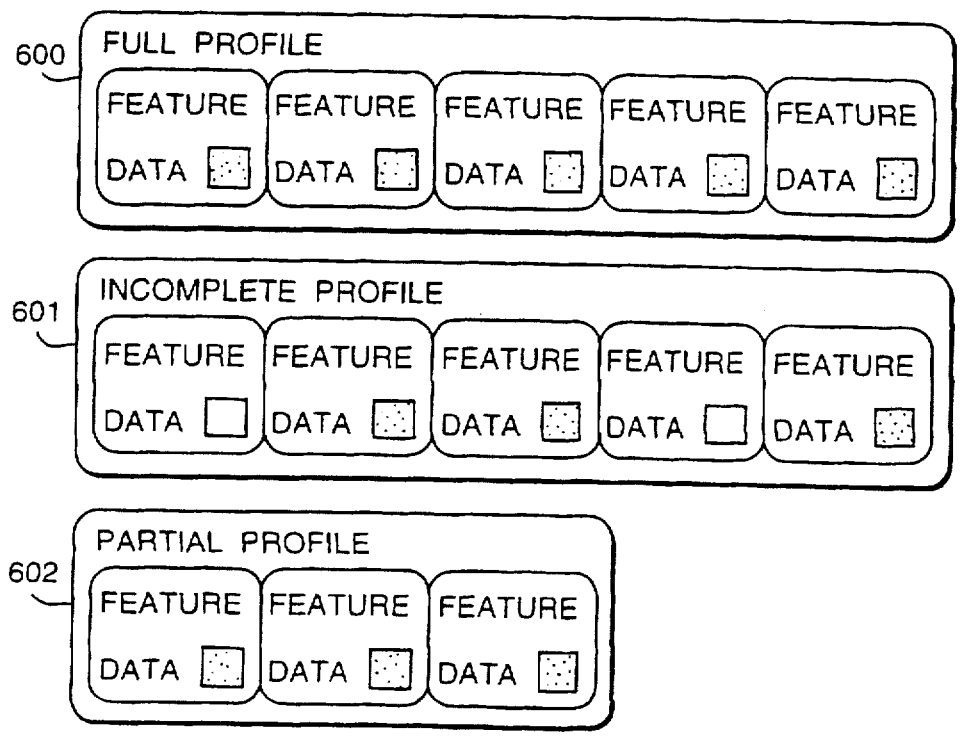
FIG. 6 shows different profile types, a profile being a user-related list of features that a user has for a particular service.

Referring to FIG. 6, a Profile is derived from a Service Template. The Service Template may have been modified and partially or wholly provisioned by the SCE3 user. However, a Service Template does not become a Profile until a particular instance has been associated with a specific user of the Service. A Profile will contain a list of one or more features that the user has for a particular Service, and each feature needs to be provisioned with sufficient data for the feature to operate successfully within the context of that particular Service.

A distinction must be made between incomplete and partial Profiles 601, 602. An incomplete Profile 601 is one that may contain references to features that are not fully or correctly provisioned. A correctly provisioned feature should be defined as a feature that is either disabled or contains all the data that is required for it to operate successfully. It is a requirement that such profiles do not emerge from SCE3 until they have been checked and validated to contain all the necessary provisioning data. SCE3 allows the local storage of incomplete Profiles while they are under construction. Partial Profiles 602 are those that do not contain all the features that are necessary to describe the full Service, but all the features a Partial Profile does contain are correctly provisioned. Partial Profiles will be valid and passed between Service Management, SCE3, SDS and IN Elements as Profile update information.

6 Example Workstrings

FIGS. 7 to 18 are virtually self-explanatory. They should be read in pairs, the first of each pair showing an example workstring and the second of each pair showing the associated architectural activity. The purpose of these workstrings is to exercise some scenarios to demonstrate the architectural design. By doing so it is shown that the architecture will support these common activities and thereby meet the requirements put on Service Creators to deploy and provision/tailor services in a generic Intelligent Network. Each workstring is presented in the form of a Message Sequence Diagram and an Overview Diagram (derived from FIG. 2) highlighting the active components and interfaces during the particular scenario.

Figure 7:
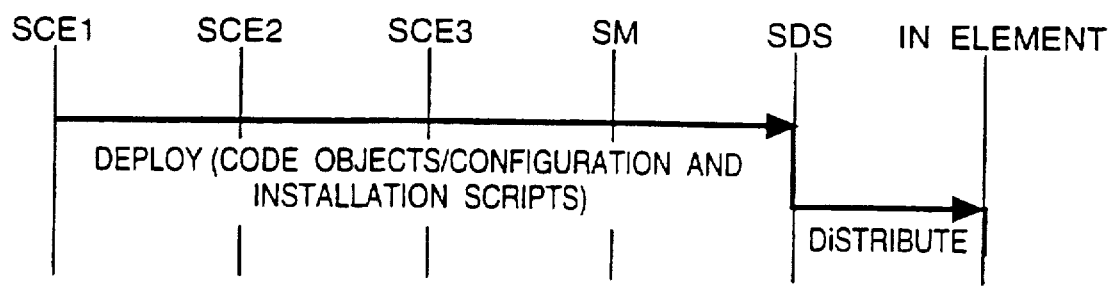
FIGS. 7 to 18 show example workstrings and their associated architectural activities.
Figure 8:
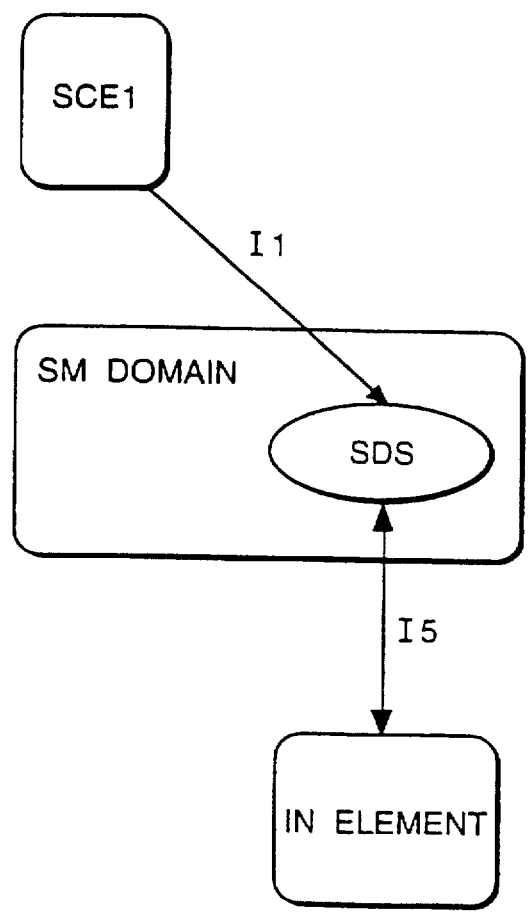

FIGS. 7 and 8 relate to the deployment of new SAFs/GSCs from SCE1.

Figure 9:
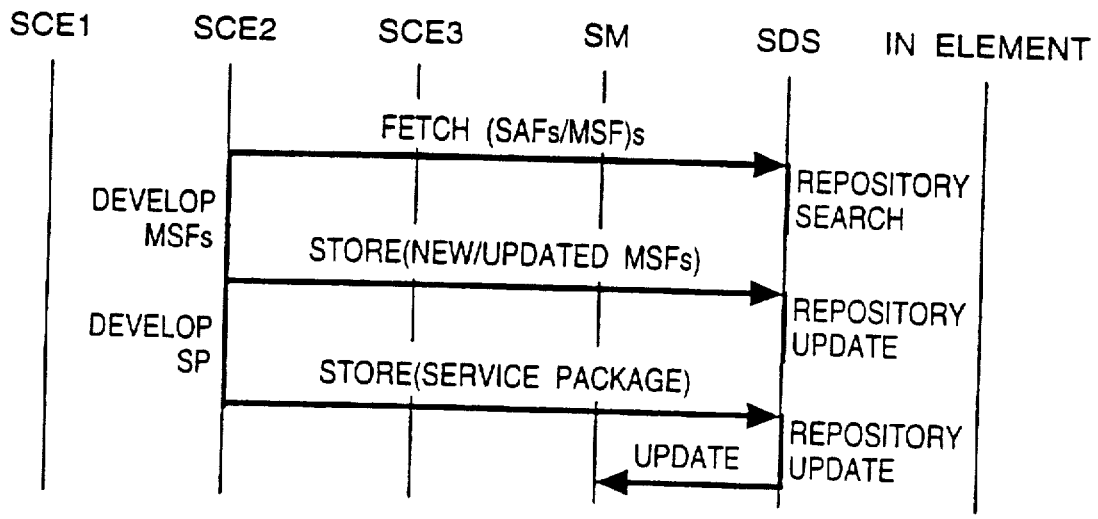
Figure 10:
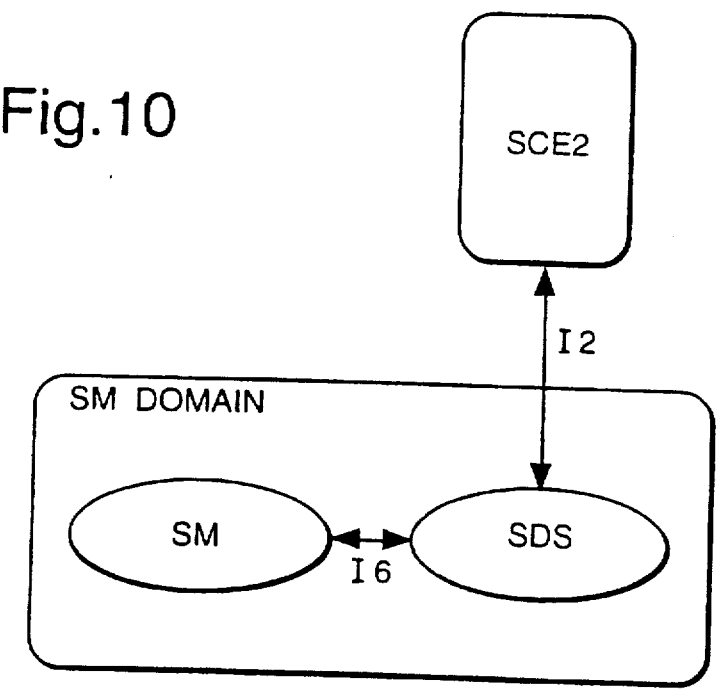
Figure 19:
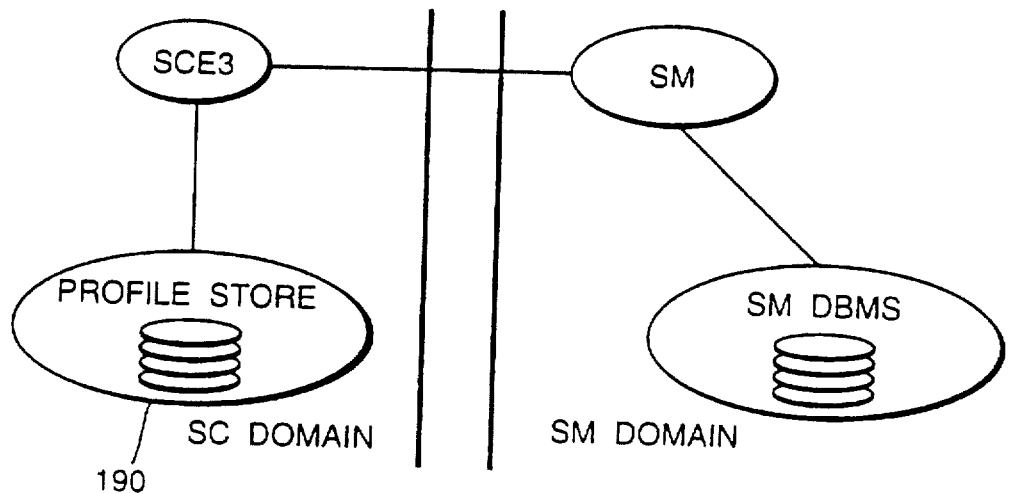
FIGS. 19 to 22 show specific data distribution scenarios which the service creation architecture of FIG. 1 will support.

FIGS. 9 and 19 relate to deployment of a new service.

Figure 11:
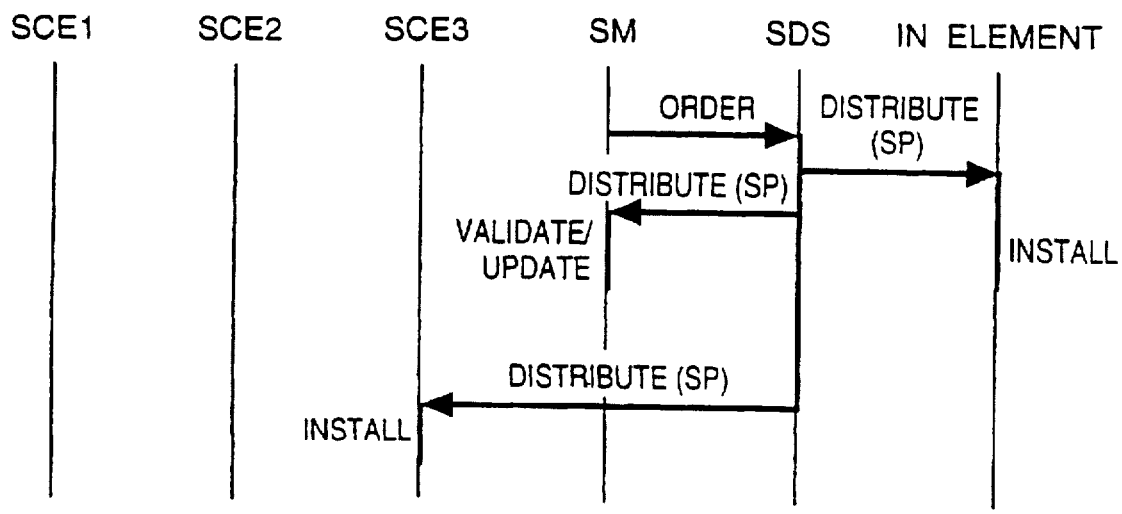
Figure 12:
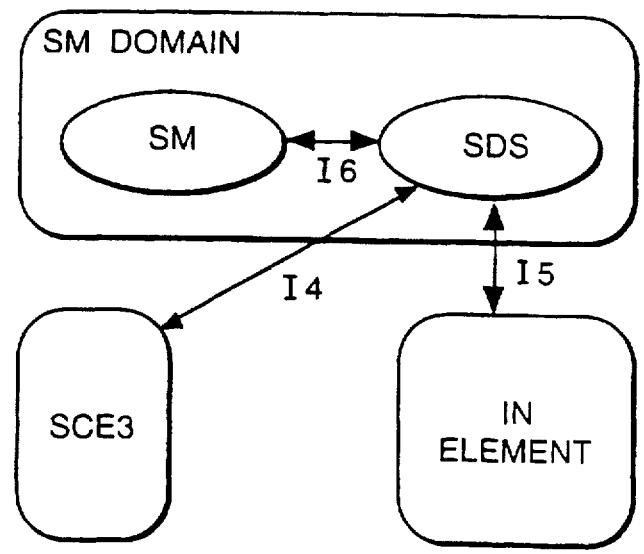

FIGS. 11 and 12 relate to ordering a new service.

Figure 13:
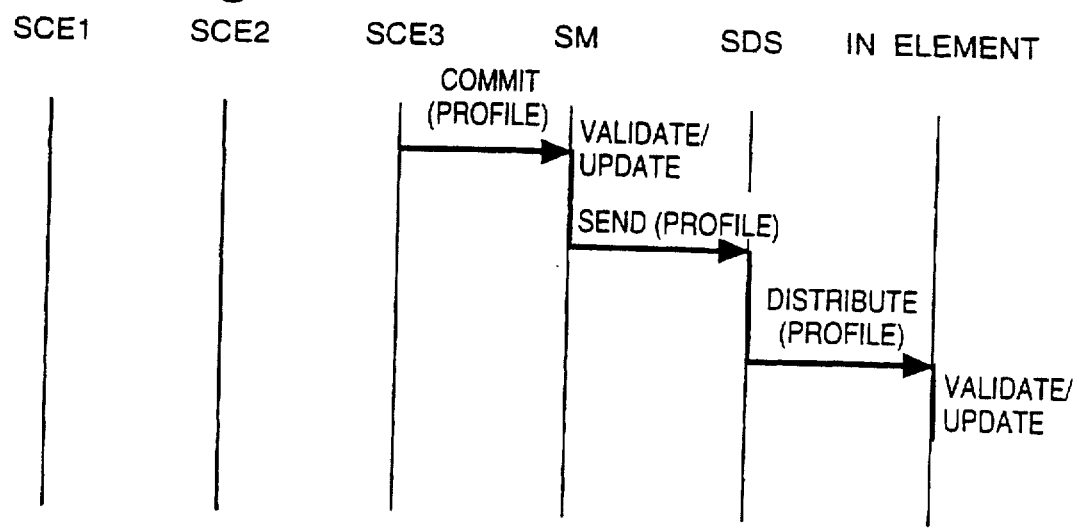
Figure 14:
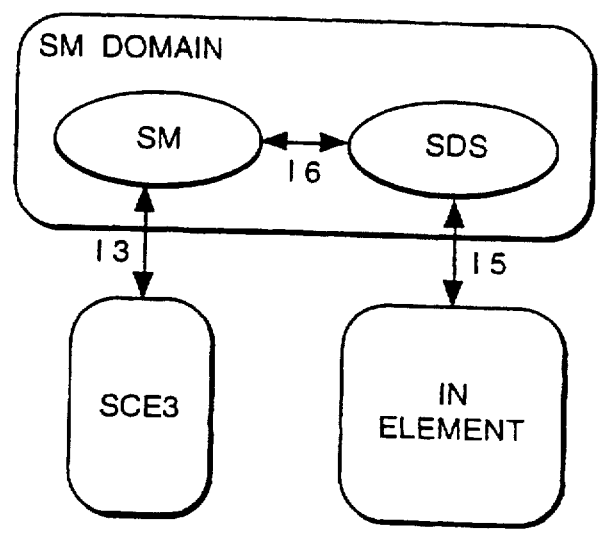

FIGS. 13 and 14 relate to updating a profile from SCE3.

Figure 15:
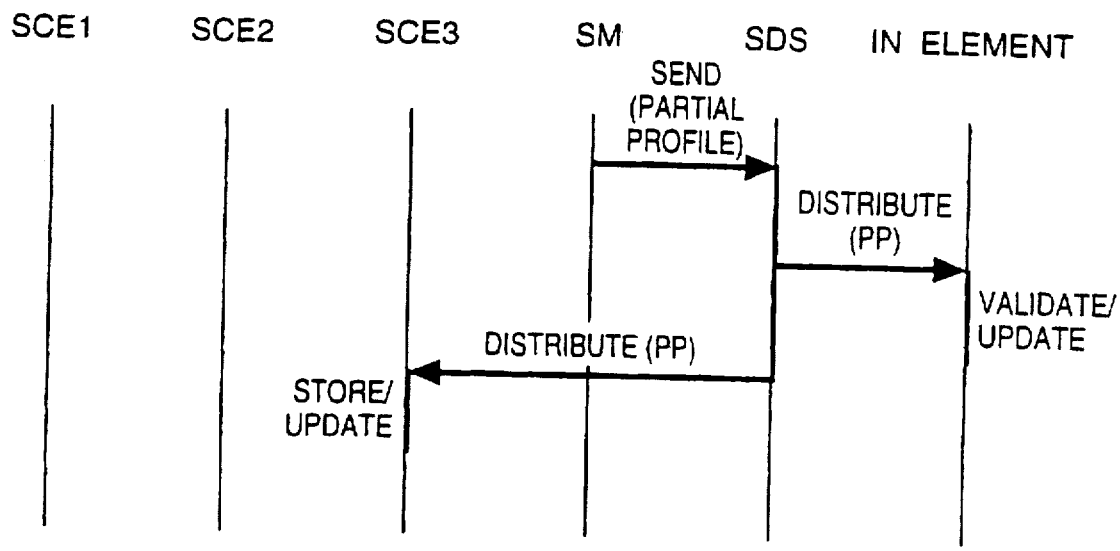
Figure 16:
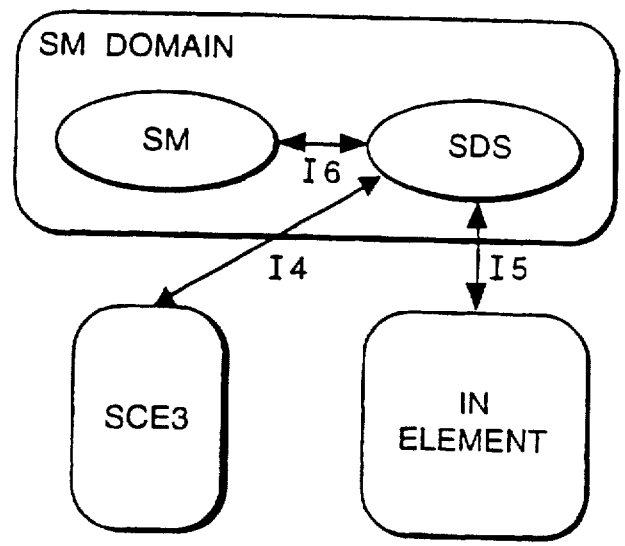

FIGS. 15 and 16 relate to profile updating from Service Management.

Figure 17:
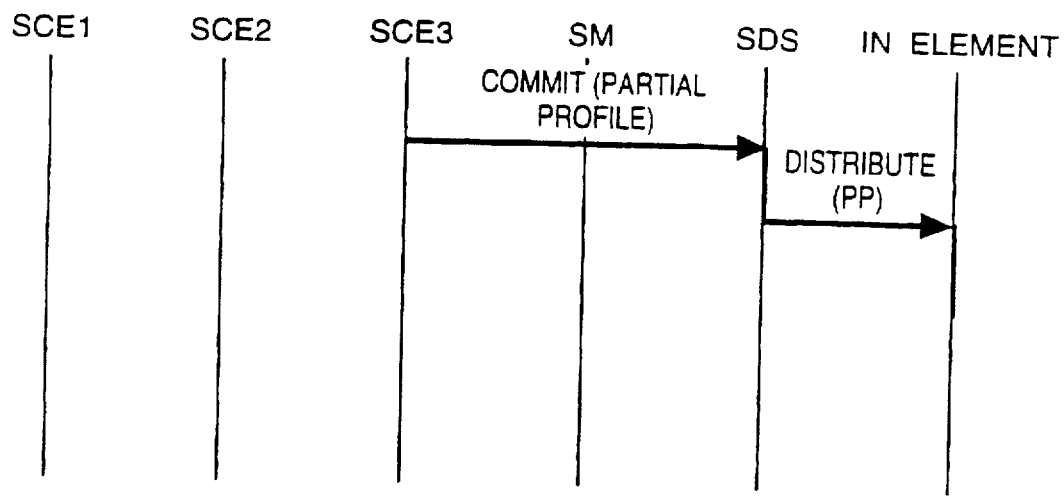
Figure 18:
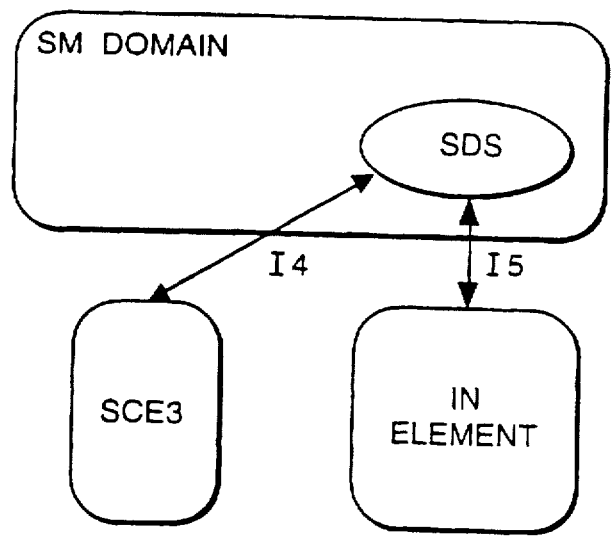

FIGS. 17 and 18 relate to Network-side Update via SCE3.

The following Appendix is part of the present disclosure. It refers to FIGS. 19 to 22 and sets out example data distributions for use in a service creation system as described above.

7 Appendix 1

7.1 Data Distribution—Implementation Scenarios

It is important to sort out the location of master data, who owns Profiles (SM or Customer) and the enforcement of Service Level Agreements (SLAs) (usually viewed as within the scope of SM). The strategy of data distribution presented here presents a data storage architecture that can be flexibly configured according to performance constraints, Service Management requirements, network operator policies and customer requirements.

In a first example, SCE3 will not be directly coupled into a specific persistent store or database product. This capability will be abstracted via a defined interface permitting retrieve, store and send operations on the store, treating it as an external system module. The architecture maintains its vendor independence by encapsulating operations on the Profile Store so that the application can be chosen or upgraded according to needs and justification. This system permits the configuration of different profile storage scenarios according to SM policies and processing capabilities. The Service Creation Architecture will support all in a range of combinations, should the requirements exist. Scenarios enabled by this architecture are shown in FIGS. 19–22.

7.1.1 Scenerio 1

Referring to FIG. 19, the Profile Store 190 resides within the Service Creation Domain. Store and retrieve operations happen locally and send operations allow provisioned profiles to be transmitted to SM.

Implications

Customers own, manage and are responsible for their own profile data until committed to SM.

Profiles are reconstructed from SDS data which maintains mastery over all network service data.

SCE3 customers must be provided with applications and support for profile data management.

7.1.2. Scenario 2

Figure 20:
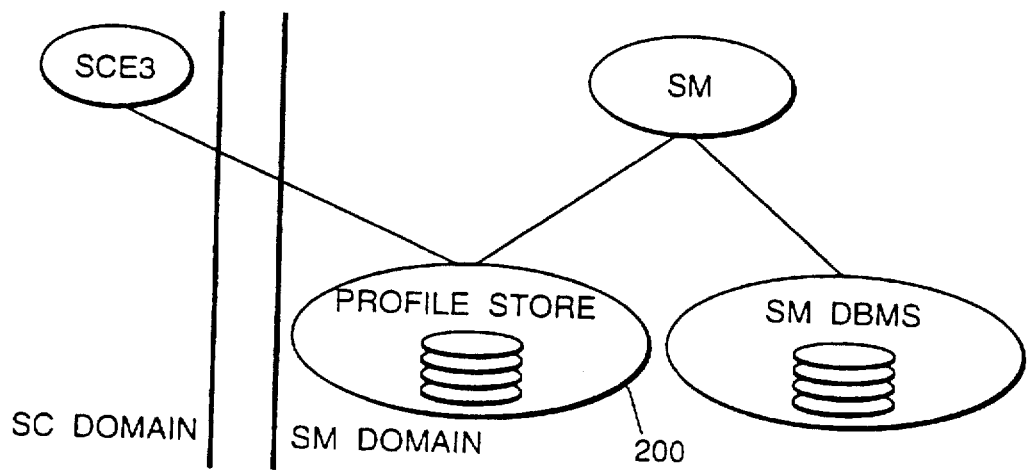

Referring to FIG. 20, all data is mastered on the SM. Profiles are passed from SCE3 to a Profile store 200 on the SM system. On retrieval, Service Management data is converted back into an updated Profile in the Profile Store 200 and then returned to the query process in SCE3.

Implication

SM is master and host of all data, including user profiles.

7.1.3 Scenario 3

Figure 21:
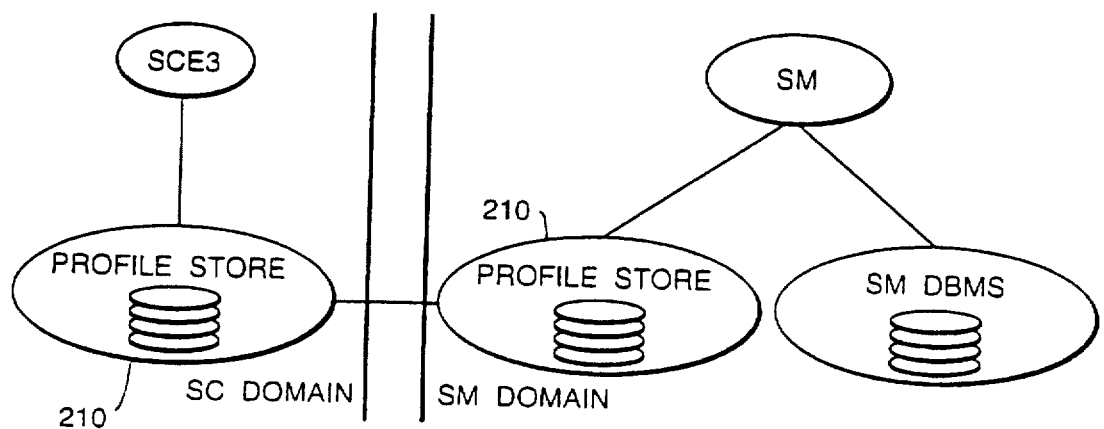

Referring to FIG. 21, a Distributed Profile Store 210 allows Scenarios 1 and 2 to be configured according to performance, policy and requirements on a per customer basis.

Implications

The data interface between two domains will be managed by whatever proprietary mechanisms exist within the chosen store implementation.

Chosen storage application must support distributed configuration.

7.1.4 Scenario 4

Figure 22:
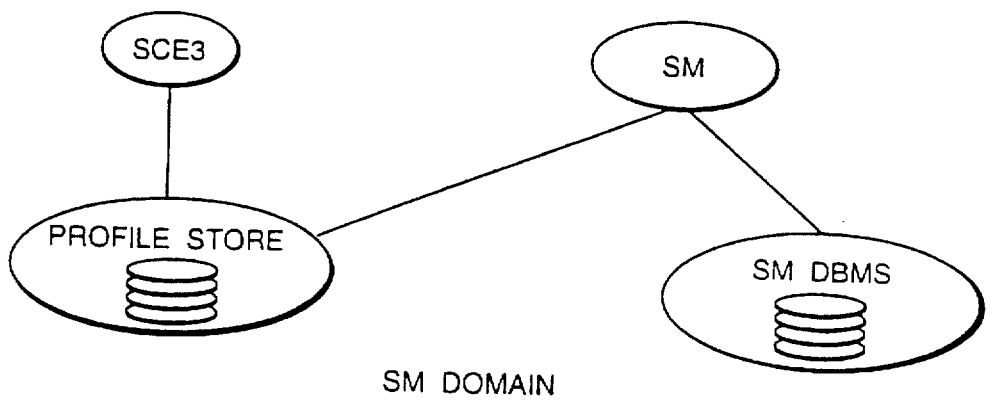
Figure 23:
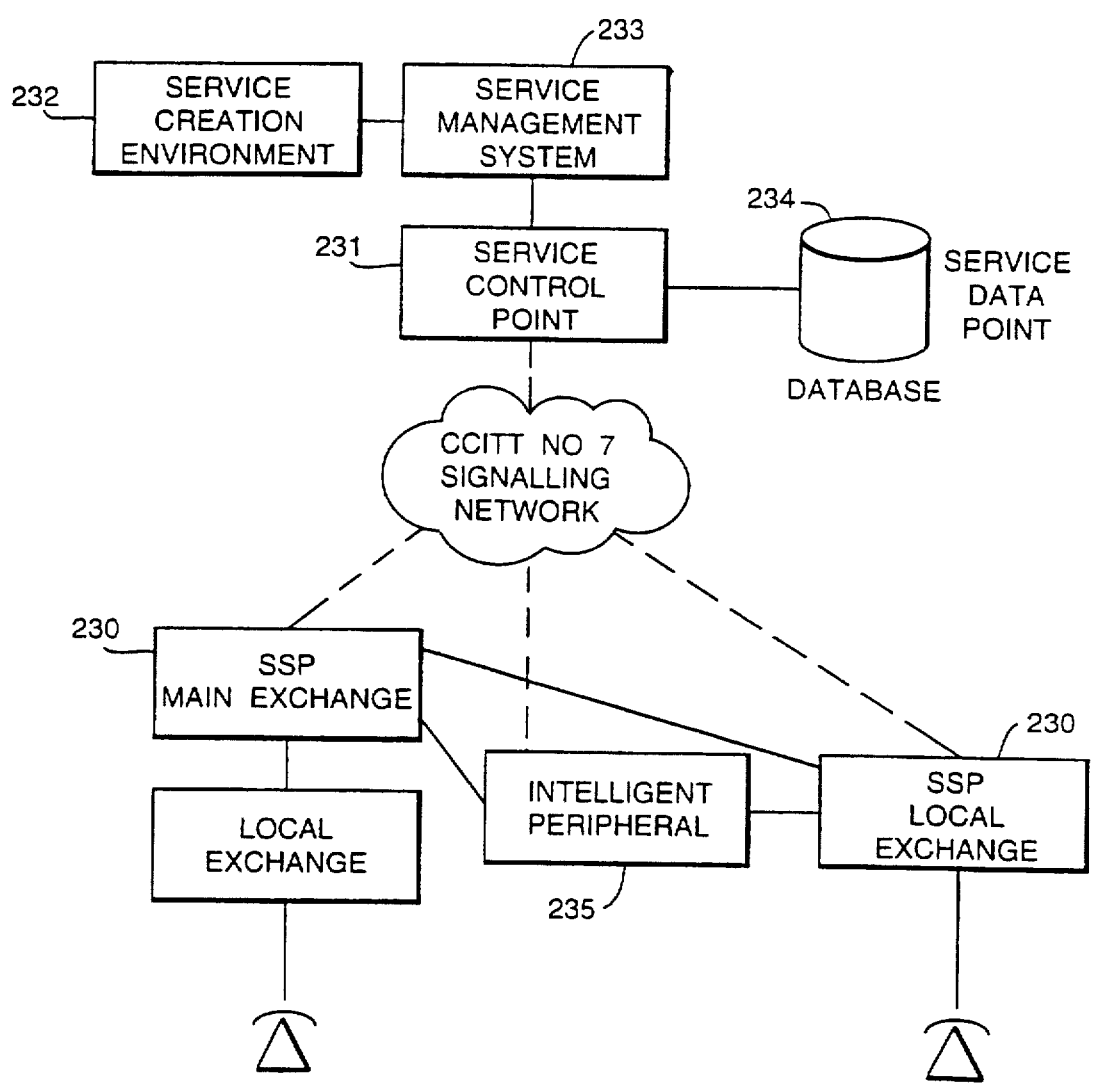
FIG. 23 shows a schematic diagram of a known type of IN architecture.

Referring to FIG. 22, SCE3 is co-resident in the SM domain. This provides for the use of SCE3 by the network operator's people on the Service Management system, providing customer support directly into their Service Packages and User Profiles.

Implications

Both customers and the network operator's support people will provision and update Profiles via the same toolset and provisioning screens, Certain customers may require remote access to the SCE3 toolset via some form of graphical workstation or client application (e.g. exceed), Service Management platforms must support SCE3 applications.

Embodiments of the present invention provide a Service Creation system that offers facilities useful to multiple types of different users. For instance, it allows marketing users to build complete service packages from service features, or to modify existing service packages for different markets. The system provides a pallet of Marketable Service Features which can be combined in a variety of ways to produce the logical flow of the Service Package. Every feature may have aspects of security, feature interaction avoidance, billing, and provision which have to be taken into account. The system can automate the building of provisioning screens, billing records, templates and all information needed for a service package to be deployed. This can then be made available to a distribution service which sends the service package to the nodes of the intelligent network, the various management systems that will run the service, and to the customer.

In use, a company may hear about a network operator's (BT for example) new service offering and request the service. Initial provisioning information is loaded into the service management system of the network and the customer now has the service. The customer can then have a terminal, perhaps a personal computer, which will allow them to provision and change their own service data rather than using an operator of the network operator. They can create templates for different groups of users which will give them access to the appropriate level of service. They may also be able to change the service logic such as the order of options on a menu or which service takes precedence. The service creation system can be sufficiently flexible that the customer can have as much or as little control of a service, or in a service, as they feel necessary.

It might be noted in the above description that terminology such as "encapsulation" and "objects" is used. This type of terminology will be recognised as being simply the language of object oriented software engineering and programming and has the same meaning here as would be understood by a person skilled in the relevant technology.

What is claimed is:

1. A service creation system for a communications network, said system comprising:
   a set of software tools for use in creating and/or modifying services available to users of the network including more than one level of service creation environment,
   said levels having interfaces therebetween, and having different respective toolsets associated therewith such that selected different sets of operations offered by the service creation system are made available at different levels, and
   wherein at least two of said levels are each provided with means to generate or access different respective types of software entity, wherein:
   a) a first of said levels has means to generate or access service application features which comprise code objects which can be deployed in elements of the network; and
   b) a second of said levels has
      i) means to generate or access marketable service features, each marketable service feature comprising a reference to one or more service application features of the first level, together with graphical definition data for modifying or inputting provisionable aspects of said service application features by means of a graphical interface, and
      ii) means to generate or access service packages, communicable to a third of said levels, each service package comprising a set of marketable service features or references to a set of marketable service features, together with at least one service template, the service template providing a tested expression of a service with embedded rules to impose constraints on operations by a user at said third of said levels to customize a service.

2. A system as in claim 1 wherein:
said provisionable aspects include billing and the graphical definition data therefore supports modification or input of billing aspects of at least one service application feature.

3. A system as in claim 1 wherein:
said provisionable aspects include network management and the graphical definition data therefore supports modification or input of network management aspects of at least one service application feature.

4. A service creation system as in claim 1 wherein:
the service creation environment is interfaced to a service management system and a service distribution system, for use in managing and deploying service functionality of the network, and
the different levels of the service creation environment are interfaced to different respective components or sets of components in the service management and/or service distribution systems.

5. A system as in claim 4 wherein:
a first of the levels is provided with an output to the service distribution system but no input therefrom, while at least a second of the levels is provided with both an output to and an input from said service distribution system.

6. A system as in claim 5 wherein:
a third of said levels is interfaced to the service management system.

7. A service creation method for a communications network, said method comprising:
   using a set of software tools to create and/or modify services available to users of the network including level of service creation environment,
   providing interfaces between said levels and associating different respective toolsets therewith such that selected different sets of operations offered by the service creation system are made available to different levels, and
   using at least two of said levels to each to generate or access different respective types of software entity, wherein:
   a) a first of said levels is generated or service application features accessed which comprise code objects which can be deployed in elements of the network; and
   b) a second of said levels
      i) generates or accesses marketable service features, each marketable service feature comprising a reference to one or more service application features of the first level, together with graphical definition data for modifying or inputting provisionable aspects of said service application features by means of a graphical interface, and
      ii) generates or accesses service packages, communicable to a third of said levels, each service package comprising a set of marketable service features or references to a set of marketable service features, together with at least one service template, the service template providing a tested expression of a service with embedded rules to impose constraints on operations by a user at said third of said levels to customize a service.

8. A method as in claim 7 wherein:
said provisionable aspects include billing and the graphical definition data therefore supports modification or input of billing aspects of at least one service application feature.

9. A method as in claim 7 wherein:
said provisionable aspects include network management and the graphical definition data therefore supports modification or input of network management aspects of at least one service application feature.

10. A service creation method as in claim 7 wherein:

the service creation environment is interfaced to a service management system and a service distribution system, for use in managing and deploying service functionality of the network, and the different levels of the service creation environment are interfaced to different respective components or sets of components in the service management and/or service distribution systems.

11. A method as in claim 10 wherein:

a first of the levels is provided with an output to the service distribution system but no input therefrom, while at least a second of the levels is provided with both an output to and an input from said service distribution system.

12. A method as in claim 11 wherein:

a third of said levels is interfaced to the service management system.

* * * * *